United States Patent
Howell et al.

(10) Patent No.: US 7,525,044 B2
(45) Date of Patent: Apr. 28, 2009

(54) WIREWAY SECTION WITH HINGED COVER

(75) Inventors: Gary W. Howell, Denison, TX (US); Duan E. Packard, III, Sherman, TX (US)

(73) Assignee: Cooper Technologies Company, Houston, TX (US)

( * ) Notice: Subject to any disclaimer, the term of this patent is extended or adjusted under 35 U.S.C. 154(b) by 125 days.

(21) Appl. No.: 11/741,425

(22) Filed: Apr. 27, 2007

(65) Prior Publication Data
US 2008/0263976 A1    Oct. 30, 2008

(51) Int. Cl.
    *H02G 3/04*    (2006.01)
(52) U.S. Cl. ............... 174/68.3; 174/68.1; 174/481; 174/101; 52/220.7; 138/155
(58) Field of Classification Search ........... 174/480, 174/481, 68.1, 68.3, 72 A, 97, 98, 482, 500, 174/135, 101, 66, 67; 220/3.3, 3.8, 3.5, 3.7; 248/49, 65; 211/26; 385/134, 135; 52/220.3, 52/220.5, 220.7; D13/155; 138/158, 155, 138/156, 162
See application file for complete search history.

(56) References Cited

U.S. PATENT DOCUMENTS

| | | | | |
|---|---|---|---|---|
| 3,243,503 A | * | 3/1966 | Burley | 174/68.3 |
| 3,312,251 A | * | 4/1967 | Marks et al. | 174/68.3 |
| 3,968,322 A | * | 7/1976 | Taylor | 174/72 A |
| 5,024,251 A | * | 6/1991 | Chapman | 174/68.3 |
| 5,728,976 A | * | 3/1998 | Santucci et al. | 174/68.3 |
| 5,898,132 A | * | 4/1999 | Lee | 174/101 |
| 6,107,576 A | * | 8/2000 | Morton et al. | 174/68.3 |
| 6,216,746 B1 | * | 4/2001 | Guebre-Tsadik et al. | 174/68.3 |
| 6,297,451 B1 | * | 10/2001 | Ernst | 174/66 |
| 6,437,243 B1 | * | 8/2002 | VanderVelde et al. | 174/68.3 |

OTHER PUBLICATIONS

Hammond Manufacturing Enclosures, Commercial Enclosure, hammfg.com, 2 pages.
Hammond Manufacturing Enclosures, Lay in Wireway NEMA 1, catalog, pp. 16-19, admitted prior art.
Hoffman, Lay-In NEMA Type 1 Hinged Cover Wireway, Product Catalog, hoffmanonline.com, 2 pages, dated 2005.
Hoffman, Lay-In NEMA Type 3R Wireway, Product Catalog, hoffmanonline.com, 2 pages, dated 2005.
Hoffman, Lay-In NEMA Type 1 Painted Flat Cover Wireway; 2 pages, dated Apr. 2007.
Wiegmann, HS & S Series Wireway NEMA 1 Wireway & Fittings, pp. G2-G7, admitted prior art.
Wiegmann, LJW Series NEMA 12 Lay-In Wireway & Fittings, pp. G8-G11, admitted prior art.
Wiegmann, SSJW Series NEMA 12 Stainless Feed-Through Wireway & Fittings, pp. G16-G17, admitted prior art.

(Continued)

*Primary Examiner*—Angel R Estrada
(74) *Attorney, Agent, or Firm*—Senniger Powers LLP

(57) ABSTRACT

A section of wireway having an elongate channel-shaped body and cover for the body. The cover has a releasable hinge connection with the body for swinging between open and closed positions. In one embodiment, the hinge connection comprising at least two T-shaped slots in a side wall of the body at locations spaced along the length of the body and at least two T-shaped hinge members on the cover receivable in said slots for hinging the cover to the body.

16 Claims, 13 Drawing Sheets

OTHER PUBLICATIONS

Wiegmann, RSCG Series NEMA 3R Wiring Through, pp. G18-G19, dated 2003.
Wiegmann, T-CH Series NEMA 12 Hinge Cover Wiring Through, pp. G20-G21, dated 2003.
Cooper Wheelock—Enclosure Assembly Drawing, 1 page, showing admitted prior art design.
Century, UL 870 Wireways, Auxiliary gutters, and Associated Fittings, dated Jul. 16, 2003, 8 pages.

* cited by examiner

US 7,525,044 B2

WIREWAY SECTION WITH HINGED COVER

BACKGROUND OF THE INVENTION

This invention relates generally to wireways for enclosing electrical conduit, wires, cable and the like ("wire"), and more particularly to an improved construction for hinging a cover to a body of the wireway.

In general, wireways are fabricated in longitudinal sections connected end to end and mounted on ceilings, walls and other supporting surfaces. These surfaces are often elevated. A typical section of wireway includes a channel-shaped body and a cover for closing the open top of the body. In some designs, the cover is hinged to the body for swinging between open and closed positions. While the use of a hinge construction has certain benefits, conventional hinge designs require tools to install and remove the cover. As a result, the installation and removal process is inconvenient and time-consuming, especially when the wireway is elevated and the worker is working high off the floor on a ladder or other elevated support. There is a need, therefore, for an improved hinge design.

SUMMARY OF THE INVENTION

In general, one embodiment of the present invention is directed to a section of wireway comprising an elongate channel-shaped body having a first side wall, a second side wall and a bottom wall. The body has a length along an X-axis, a height along a Y-axis and a width along a Z-axis. The wireway section includes an elongate cover for the body having a releasable hinge connection with the first side wall of the body for swinging between open and closed positions about an axis extending lengthwise of the body. The cover has a length along the X-axis and a width along the Z-axis when the cover is closed The hinge connection comprises at least two slots in the first side wall of the body at locations spaced along the length of the body, and at least two hinge members on the cover receivable in the slots for hinging the cover to the body. Each of the slots comprises an upper portion and a lower portion narrower than the upper portion along the X-axis. Each of the hinge members comprises a head sized for insertion through the upper portion of a respective slot and a stem narrower than the head along the X-axis sized for reception in the lower portion of the slot. The head has an X-dimension greater than an X-dimension of the lower portion of the slot.

In another embodiment, this invention is directed to a wireway body of the type described above.

In still another embodiment, this invention is directed to a wireway cover of the type described above.

Other objects and features will be in part apparent and in part pointed out hereinafter.

BRIEF DESCRIPTION OF THE DRAWINGS

Corresponding parts are designated by corresponding reference numbers throughout the drawings.

DETAILED DESCRIPTION

Figure 1:
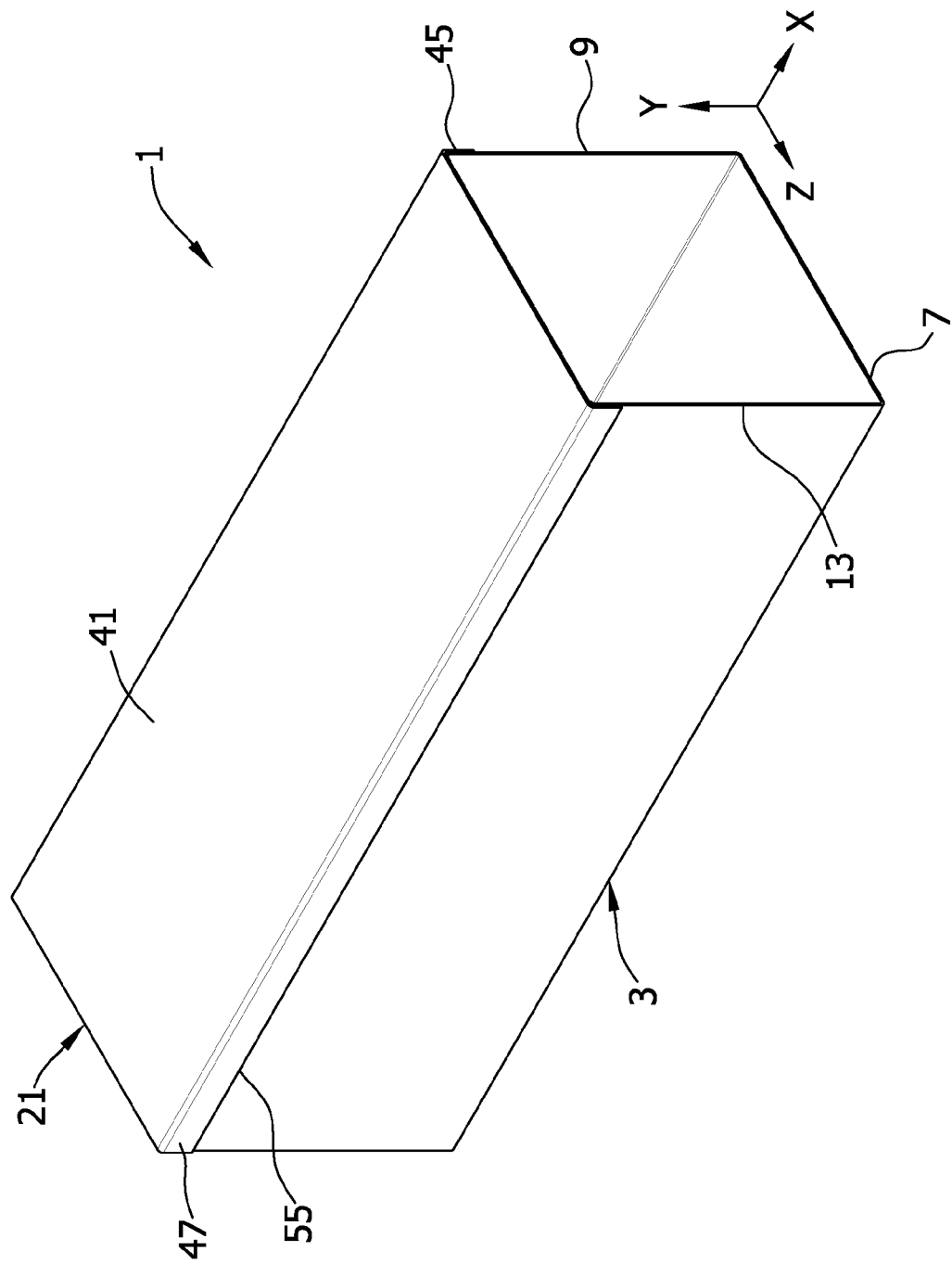
FIG. 1 is a perspective view of one embodiment of a wireway of this invention comprising a body and a cover hinged to the body, the cover being shown in a closed position.
Figure 2:
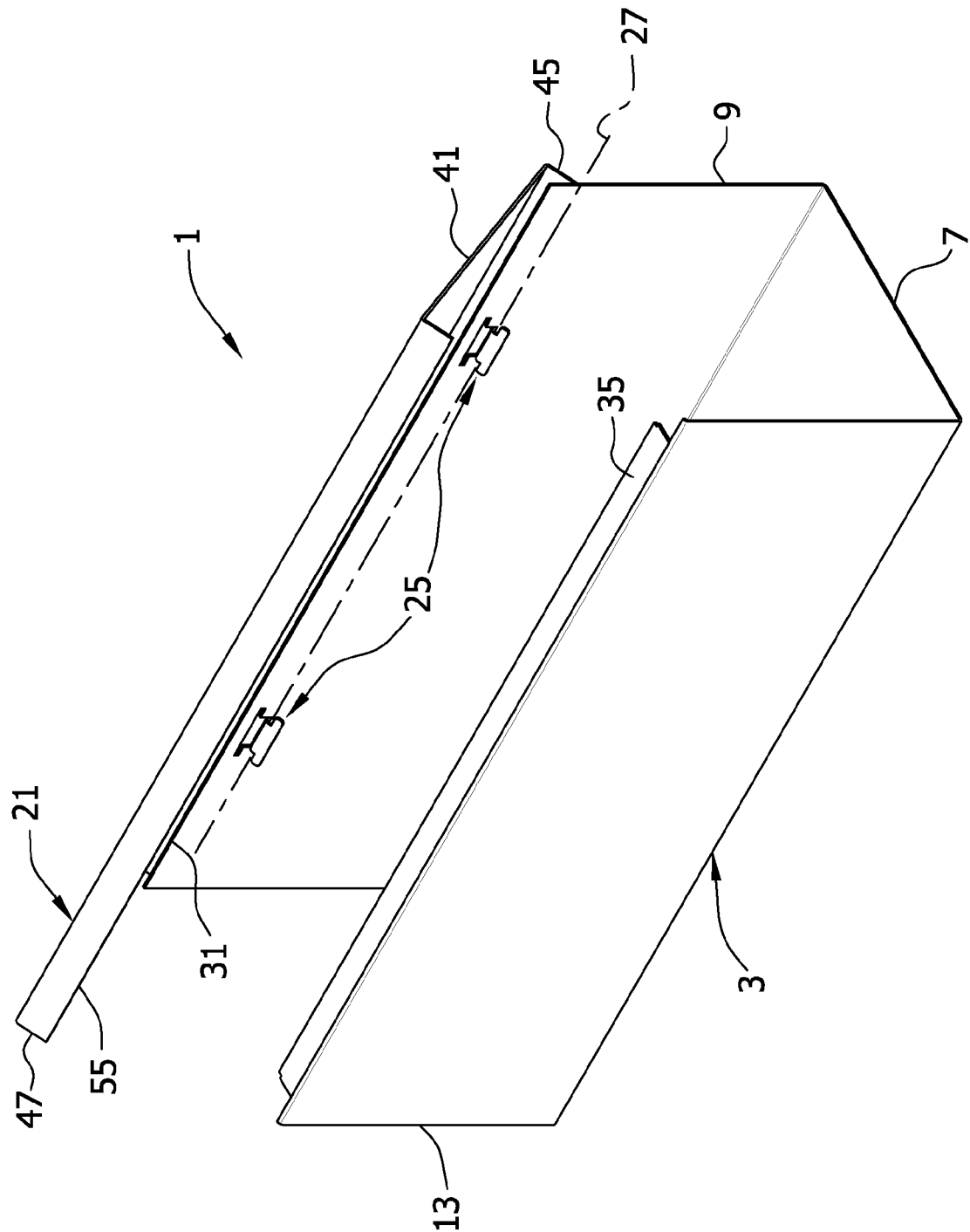
FIG. 2 is a view similar to FIG. 1 but showing the cover is a partially open position to reveal an exemplary hinge construction of this invention.

Referring now to FIGS. 1-4 of the drawings, one embodiment of a section of wireway of the present invention is indicated its entirety by the reference number 1. It will be understood that two or more of these sections may be connected end to end to form a wireway of desired length. In general, the wireway section 1 comprises an elongate channel-shaped body, generally designated 3, having a bottom wall 7 and generally parallel first and second side walls 9, 13 extending up from the bottom wall 7. The body has a length along an X-axis (see FIG. 1), a height along a Y-axis, and a width along a Z-axis. The section also includes an elongate cover, generally designated 21. The cover has a length along the X-axis and a width along the Z-axis (when the cover is closed). The cover 21 has a releasable hinge connection, generally designated 25, with the first side wall 9 of the body for swinging between open and closed positions about an axis 27 extending lengthwise of the body. Each of these components is described in greater detail below. For convenience, dimensions along the X, Y and Z axes shown in FIG. 1 will be referred to herein as "X" dimensions, "Y" dimensions and "Z" dimensions, respectively.

In one embodiment, the body 3 of the wireway section 1 is of metal (e.g., 14 or 16 gauge sheet metal), but it will be understood that other materials such as plastic can be used. The first side wall of the body 3 terminates in an upper 31 edge extending longitudinally of the section. The second side wall 13 has an in-turned flange 35 along its upper edge. The body has suitable X, Y and Z-dimensions. By way of example but not limitation, the X-dimension of the body may range from 12-120 inches, and suitable Y/Z dimensions include 3×3, 4×4, 6×6, 8×8, 10×10, 12×12, 3×6 and 4×8 inches.

In the embodiment shown in the drawings, the cover 21 comprises a top wall 41 adapted to span the side walls of the body 3 when the cover is closed, a first flange means 45 along one side of the cover adapted to extend down alongside the first side wall 9 of the body when the cover is closed, and a second flange means 47 along the opposite side of the cover adapted to extend down alongside the second side wall 13 of the body when the cover is closed. The first flange means 47 terminates in a lower edge 51 (FIGS. 4 and 5), and the second flange means terminates in a lower edge 55. Each of the first and second flange means 45, 47 is illustrated as a single continuous flange extending from one end of the cover to its opposite end, but it will be understood that the construction of either or both such flange means could vary, e.g., a single flange extending less than the full length of the cover, or multiple flanges spaced apart along the length of the cover. (The term "flange means" is intended to cover all such variations.) Desirably, the cover 21 is formed as an integral one-piece unit, but it can be divided into two or more separate (and preferably overlapping) pieces for long wireway sections. Like the body 3, the cover 21 of the wireway section 1 may be fabricated from metal (e.g., 14 or 16 gauge sheet metal) or other suitable material such as plastic. When closed, the top wall 41 of the cover overlies the in-turned flange 35 on the body 3 of the wireway section. The cover 21 may be secured in its closed position by a suitable fastening mechanism (not shown), such as one or more fasteners on the cover receivable in respective openings in the flange 35.

Figure 3:
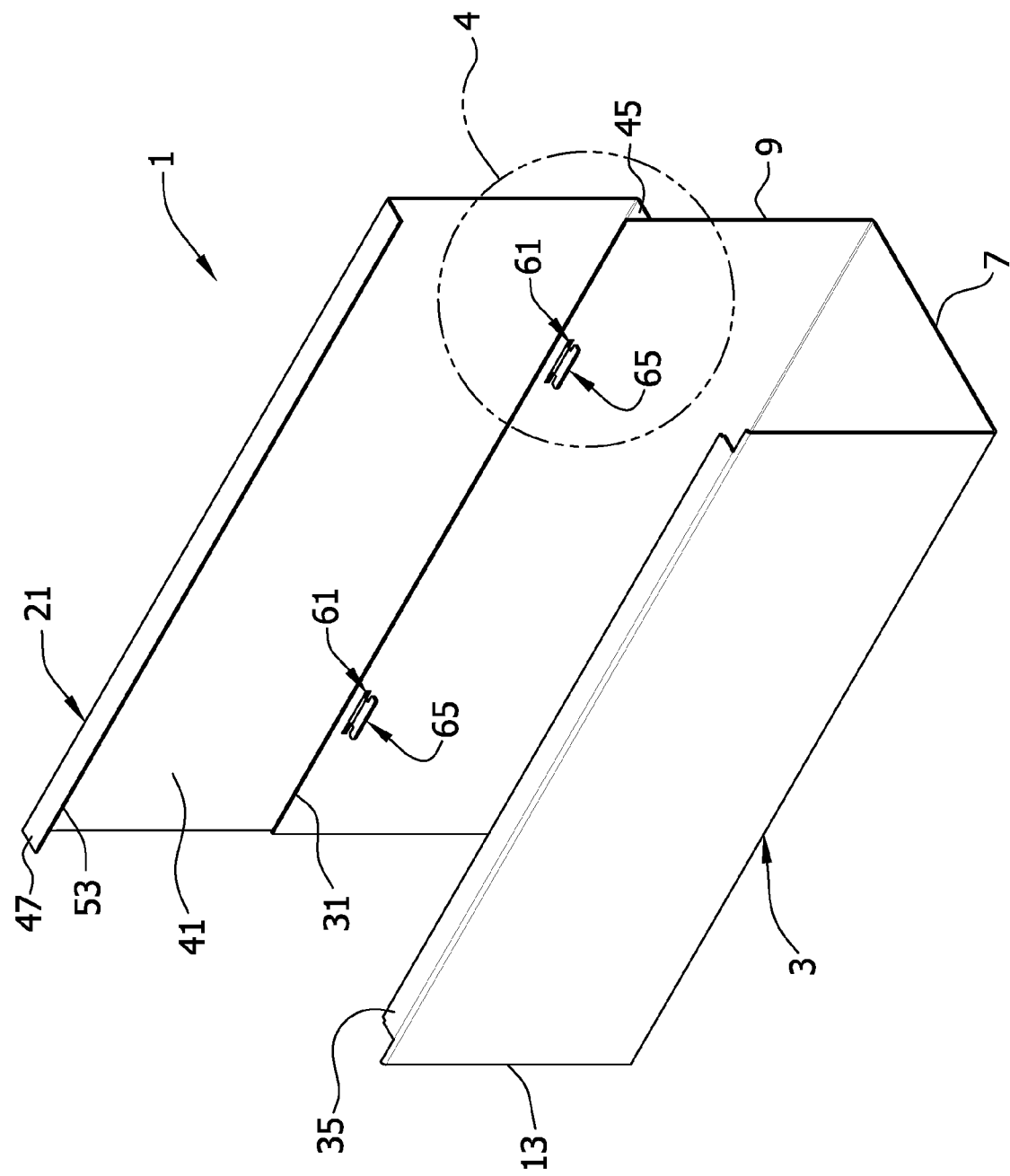
FIG. 3 is a view similar to FIG. 1 but showing the cover is a fully open position.
Figure 4:
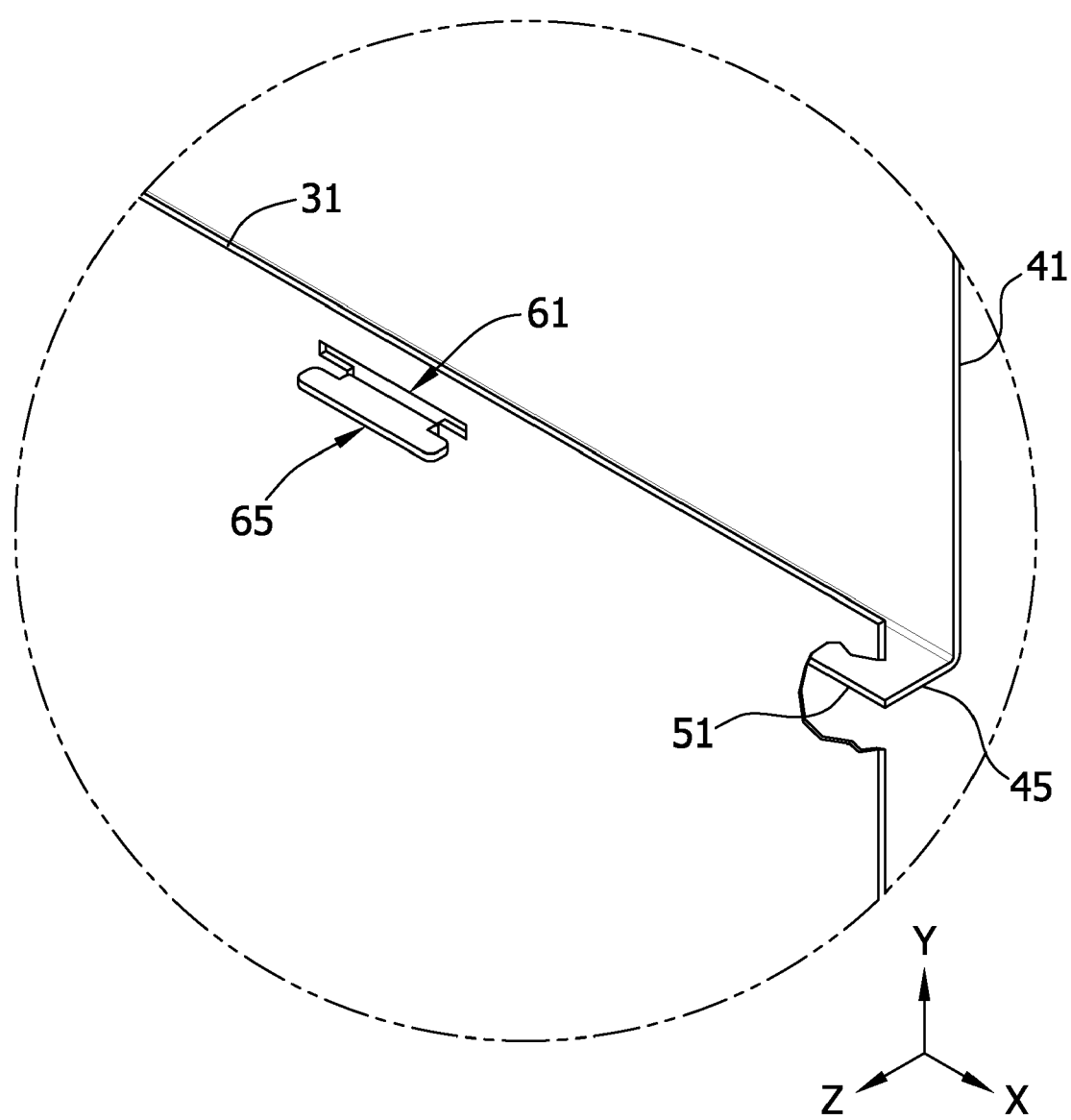
FIG. 4 is an enlarged portion of FIG. 3 showing a hinge construction.
Figure 5:
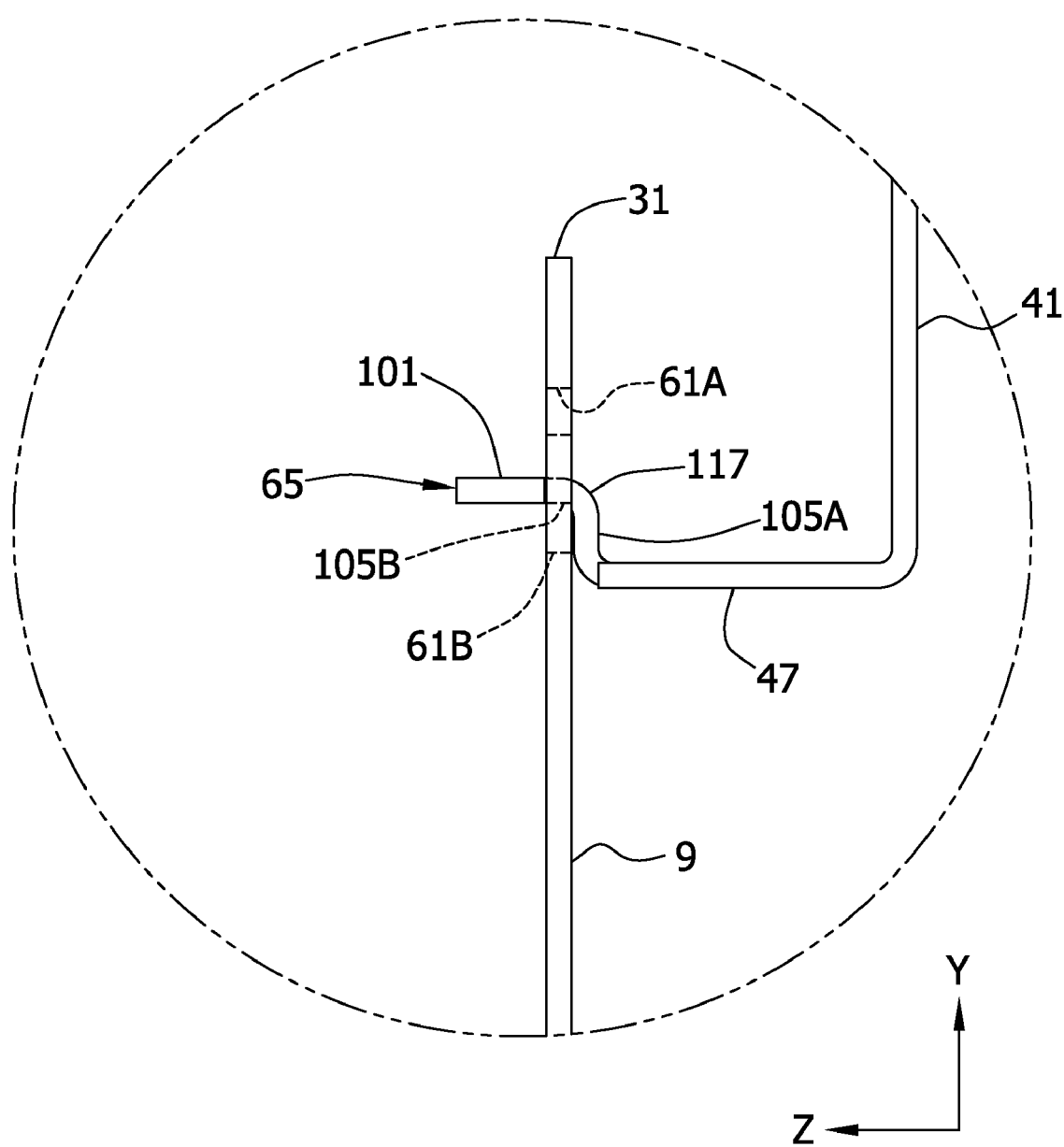
FIG. 5 is an enlarged right end view of the construction of FIG. 4 showing the hinge construction with the cover in an open position.

Referring to FIGS. 3 and 4, the releasable hinge connection 25 comprises at least two slots 61 in the first side wall 9 of the body 3 at locations spaced along the length of the body, and at least two hinge members 65 on the cover receivable in the slots for hinging the cover to the body. In the illustrated embodiment, only two slots 61 and two hinge members 65 are shown, but a greater number can be used, depending on the length of the body and cover.

Figure 6:
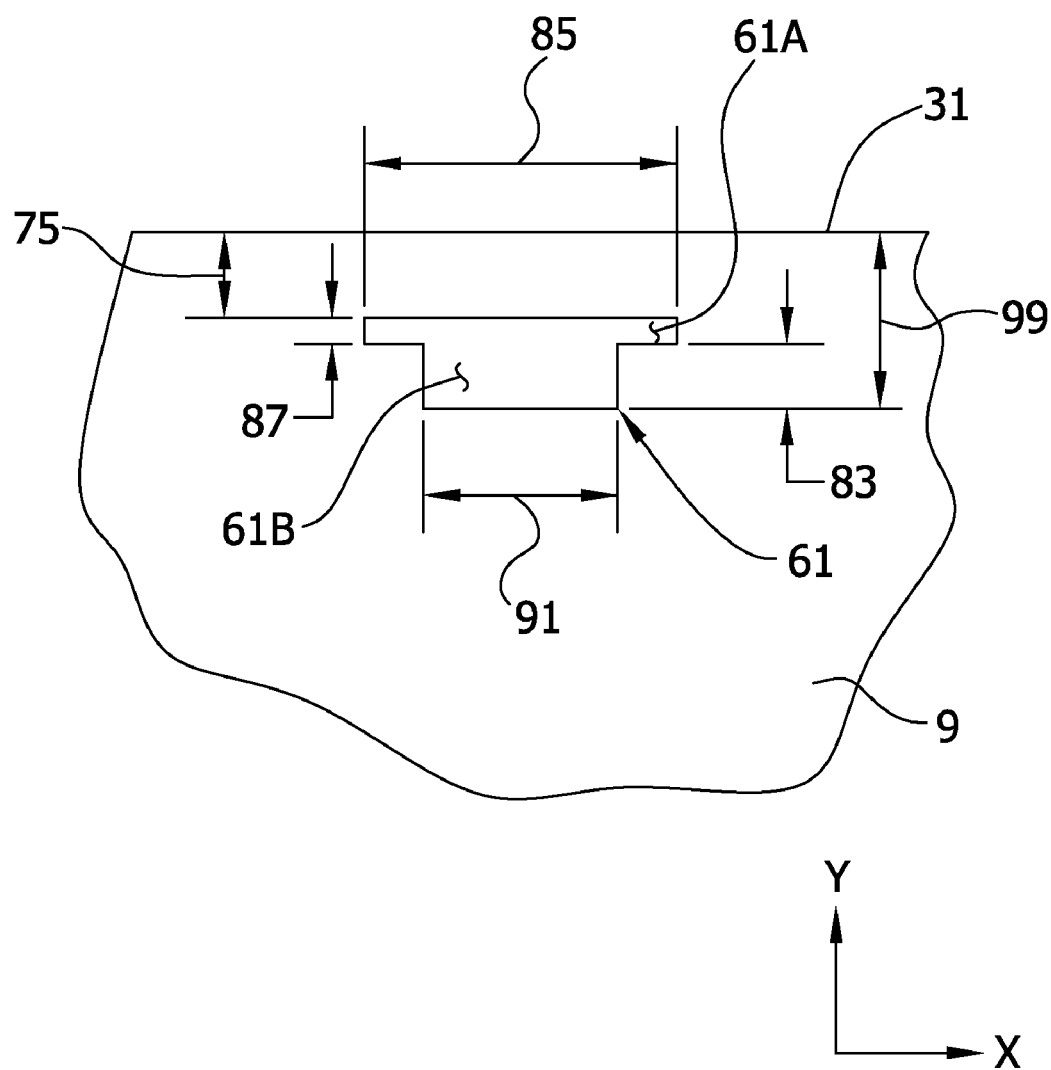
FIG. 6 is a front elevation of a slot of the hinge construction.
Figure 7:
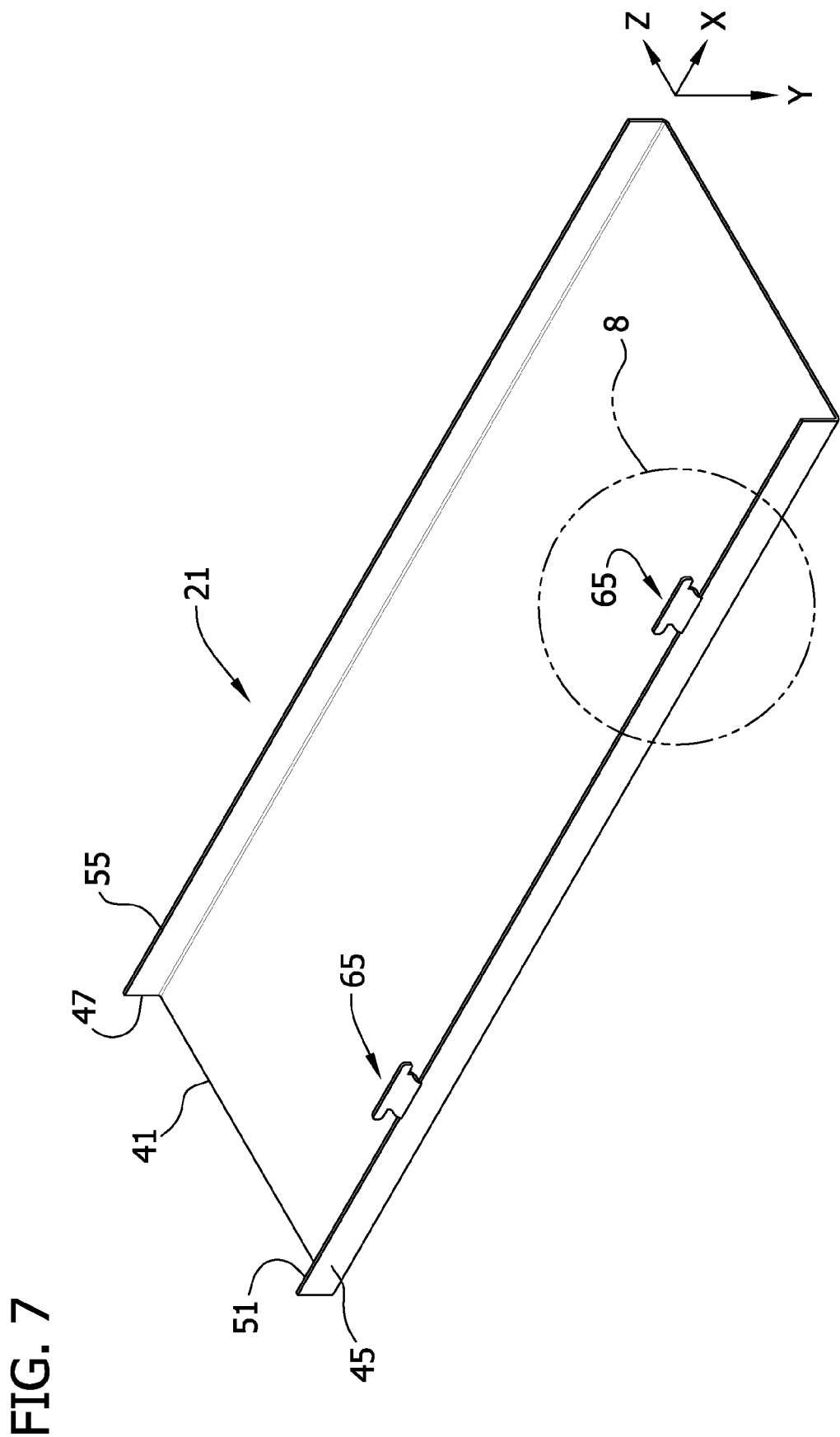
FIG. 7 is a perspective view of the underside of the cover.

Each of the slots 61 comprises an upper portion 61A spaced below the upper edge 31 of the first side wall 9 of the body 3 by a Y-dimension 75 (FIG. 6), and a narrower lower portion 61B extending down from the upper portion 71 of the slot and having a dimension 83. Referring to FIG. 6, each slot is generally T-shaped. The upper or "head" portion 61A of the T-shaped slot 61 has a relatively large X-dimension 85 and a relatively small Y-dimension 87. The lower "stem" portion 61B of the slot has an X dimension 91 less than the X-dimension 85 of the upper portion of the slot (the stem of the slot thus being narrower than the head of the slot) and a Y-dimension 83 greater than the Y-dimension 87 of the upper portion of the slot. The shape of the slot 61 can vary so long as the X-dimension of the lower slot portion 61B is less than the X-dimension 85 of the upper slot portion 61A.

The first flange means 45 has a Y-dimension 97 (FIG. 13) at least equal to and preferably somewhat greater than the distance 99 (FIG. 6) from the top edge 31 of the first wall 9 to the bottom of the slots 61. As a result, when the cover 21 is closed, the slots 61 are covered by the first flange means 45 so that the interior of the body 3 is not exposed to the outside through the slots.

Referring to FIGS. 7-10, each of the hinge members 65 comprising a head 101 sized for insertion through the upper portion 61A of a respective slot 61 and a stem 105 narrower than the head 101 sized for reception in the lower portion 61B of the slot. In this embodiment, each hinge member is generally T-shaped. Preferably, but not necessarily, the hinge members are formed as integral one-piece units with the first flange means 45 of the cover, as by a suitable metal stamping or plastic molding operation.

Figure 8:
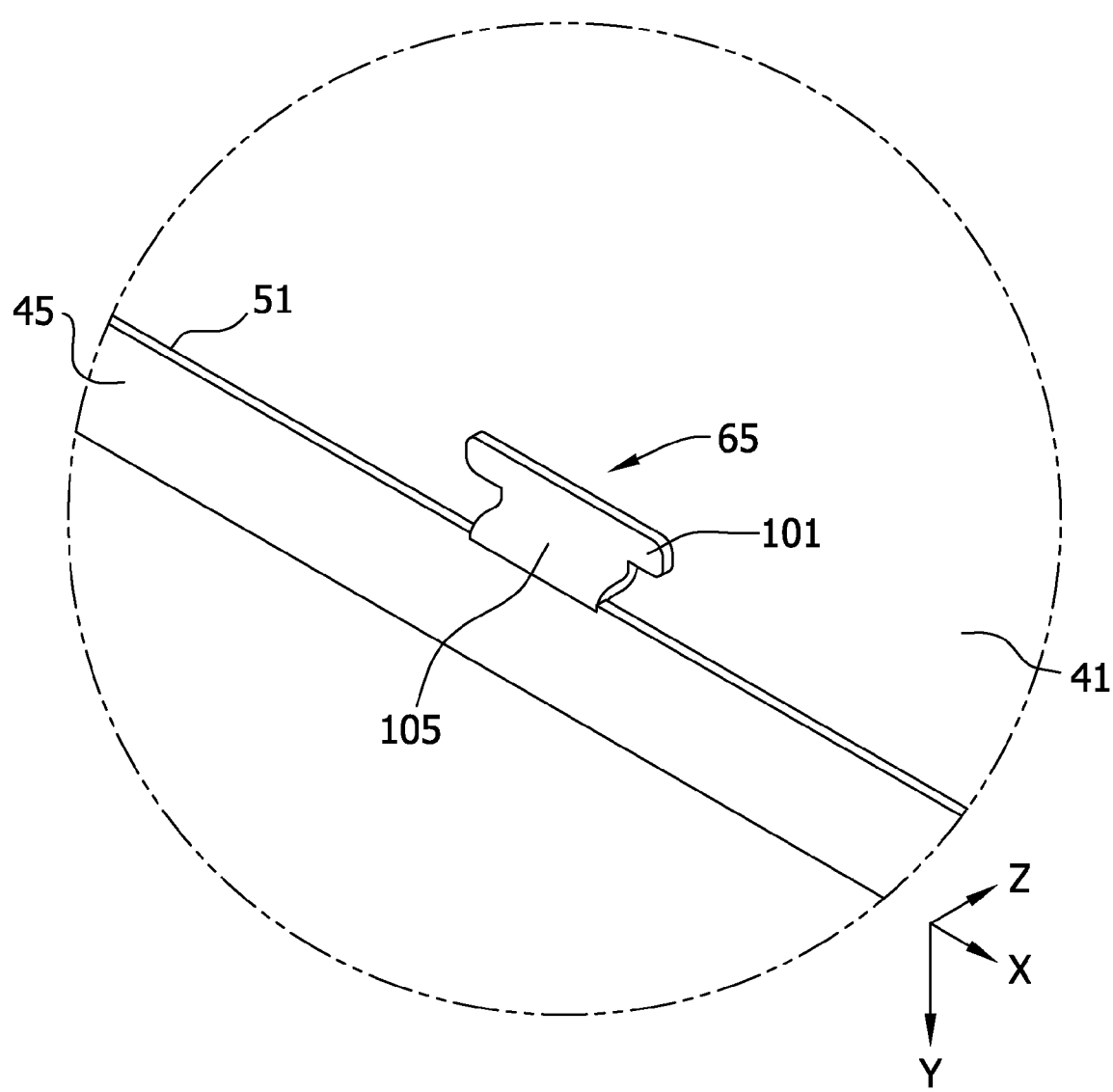
FIG. 8 is an enlarged portion of FIG. 7 showing a hinge member on the cover.
Figure 9:
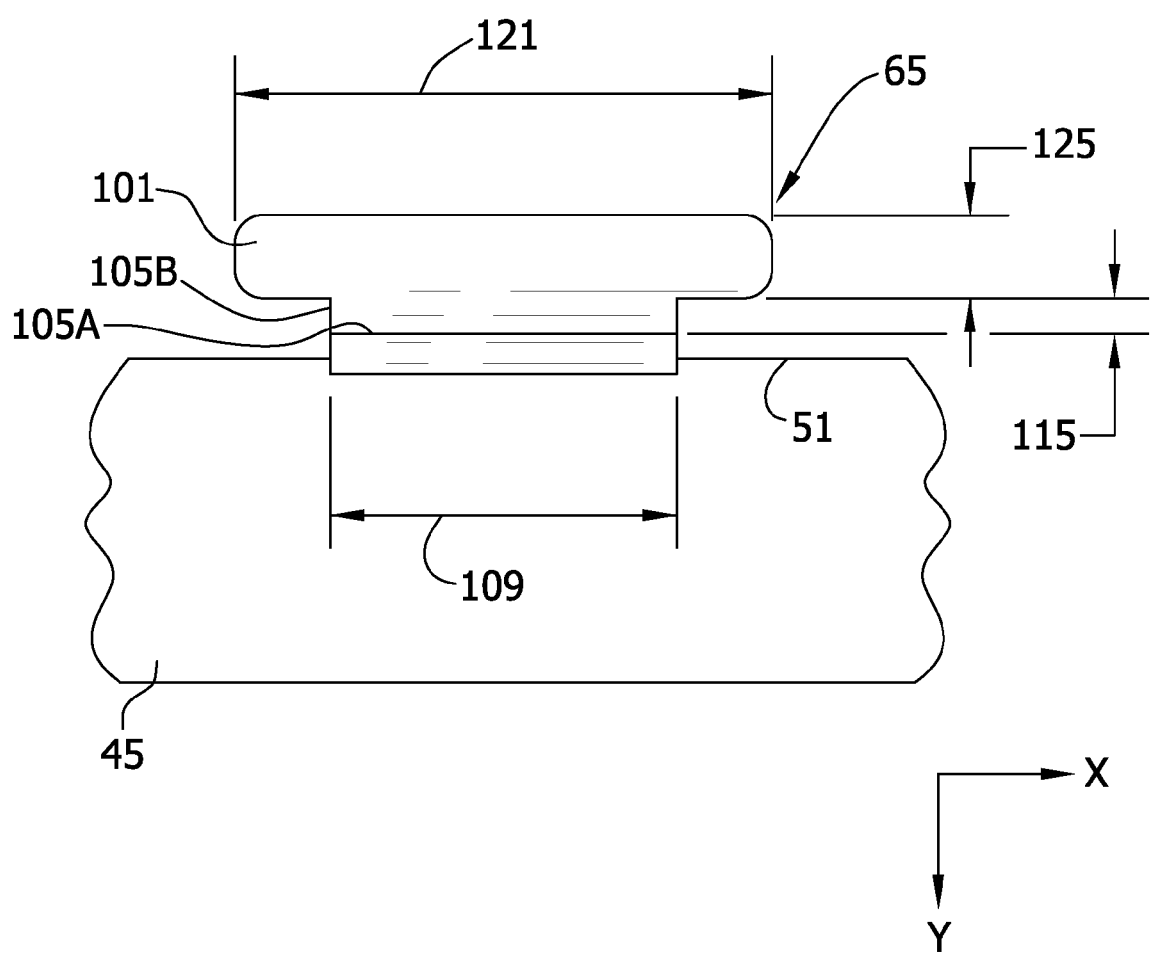
FIG. 9 is an enlarged front elevation of the hinge member.
Figure 10:
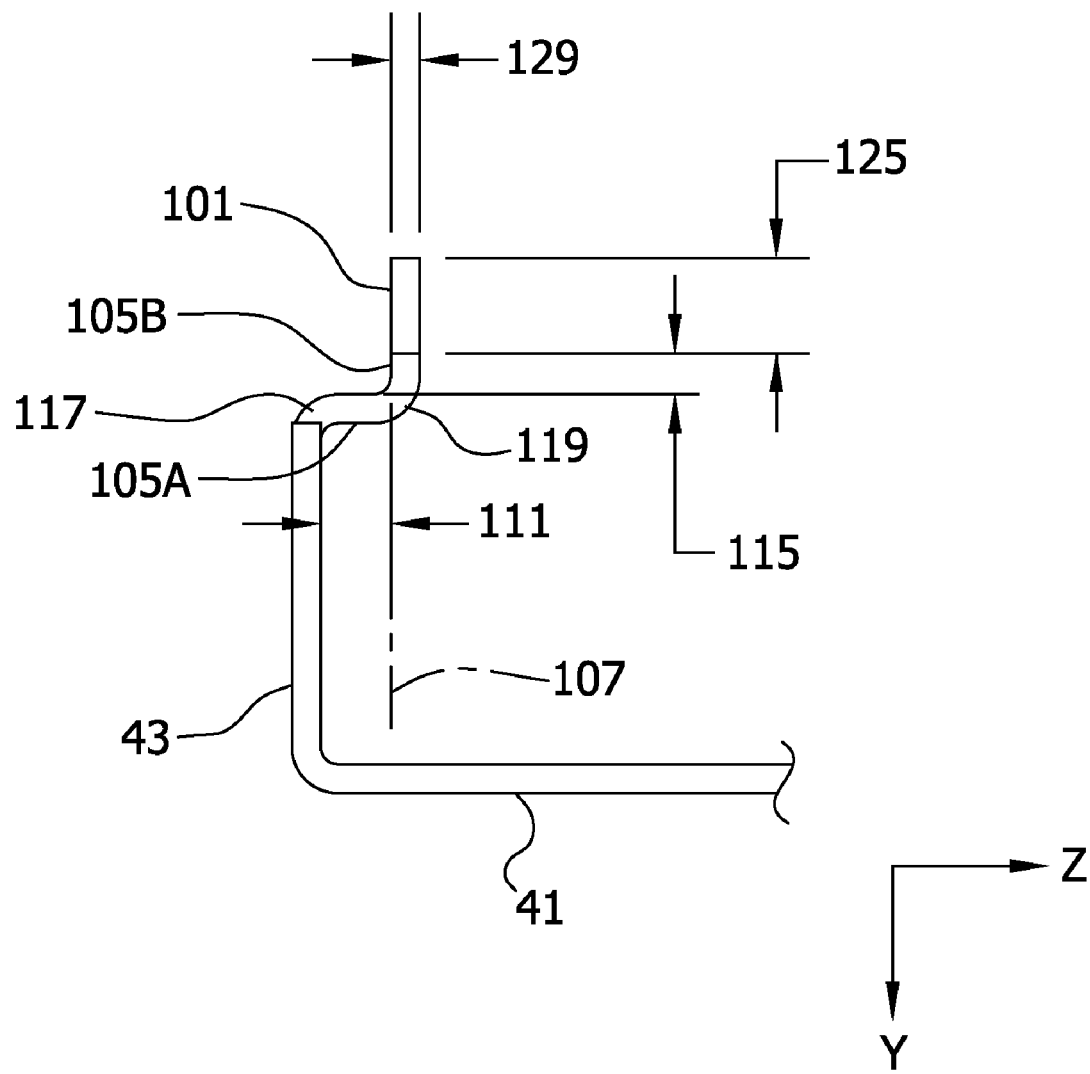
FIG. 10 is a right end elevation of FIG. 9.

As shown best in FIGS. 8 and 10, the stem 105 of each hinge member 65 has an inner portion 105A projecting from the edge 51 of the first flange means 45 generally along the Z-axis generally parallel to the top wall 41 of the cover, and an outer portion 105B extending generally along the Y-axis away from the top wall 41 of the cover in a plane 107 generally parallel to the first flange means 45. In this embodiment, the inner and outer portions of the stem have substantially the same width or X-dimension 109. The inner stem portion has a length or Z-dimension 111, and the outer stem portion has a length or Y-dimension 115 somewhat less than the Z-dimension 111. Preferably, (but not necessarily), this Y-dimension 115 is only slightly greater than the thickness of the side wall 9 of the body 3 so that the inner stem portion 105A contacts the side wall to hold the cover in an open position in which the top wall 41 of the cover is substantially parallel to the side wall 9 of the body (see FIG. 5), and desirably with a slight lean past vertical so that the cover remains open without holding it.

Desirably, the juncture 117 between the inner stem portion 105A and the first flange means 45 and the juncture 119 between the inner and outer stem portions 105A, 105B are curved to provide for smooth rotation of the cover 21 between its open and closed positions.

In the illustrated embodiment, the head 101 of the hinge member 65 is attached to the outer portion 105B of the stem 105 and is generally co-planar with the outer portion. The head is elongate in the X-direction, having a length or X-dimension 121 greater than its height or Y-dimension 125. The X-dimension 121 of the head is greater than the X-dimension 109 of the stem. The head 101 is spaced from the inner stem portion 105A by the length of the outer stem portion 105B, i.e., Y-dimension 115. The head 101 has a thickness or Z-dimension 129 (FIG. 10).

The hinge members 65 and slots 61 are configured relative to one another to provide a hinging connection 25 which is easy to assemble and disassemble while also preventing inadvertent separation of the cover 21 and body 3. In this regard, the head 101 of each hinge member 65 is sized to have X and Y-dimensions 121, 125 less than respective X and Y-dimensions 85, 87 of the upper portion 61A of the corresponding slot 61 to enable the head to pass through the upper portion of the slot. Further, the stem 105 of each hinge member 65 is sized to have an X-dimension 109 less than the X-dimension 91 of the lower portion 61B of the corresponding slot 61 so that the stem 105 can move down into the lower slot portion after the head has passed through the upper slot portion. The head 101 of the hinge member has an X-dimension 121 greater than the X-dimension 91 of the lower portion of the slot to hold the hinge member captive in the slot against inadvertent removal during ordinary use of the cover. However, the cover can readily be removed by moving the hinge members 65 up in respective slots 61 to positions in which the heads are aligned with the upper slot portions 61A, and then passing the heads through the upper slot portions to remove the cover from the body without using tools.

Desirably, the head 101 of each hinge member 65 is sized to have X and Z-dimensions 121, 129 only slightly less (e.g., no more than about 1.5 times dimension 129) than the corresponding respective X and Y-dimensions 85, 87 of the upper portion 61A of the corresponding slot 61 (i.e., the fit of the head in the upper slot portion is snug) so that the risk of an inadvertent release of the cover from the body is reduced even further. Also, it is desirable that the X-dimension 109 of the stem 105 of each hinge member 65 be only slightly less (e.g., no more than about 1.5 times dimension 129) than the corresponding X-dimension 91 of the lower portion 61B of the slot 61 to limit the extent the cover can move relative to the body along the X-axis after the cover has been installed on the body.

Figure 11:
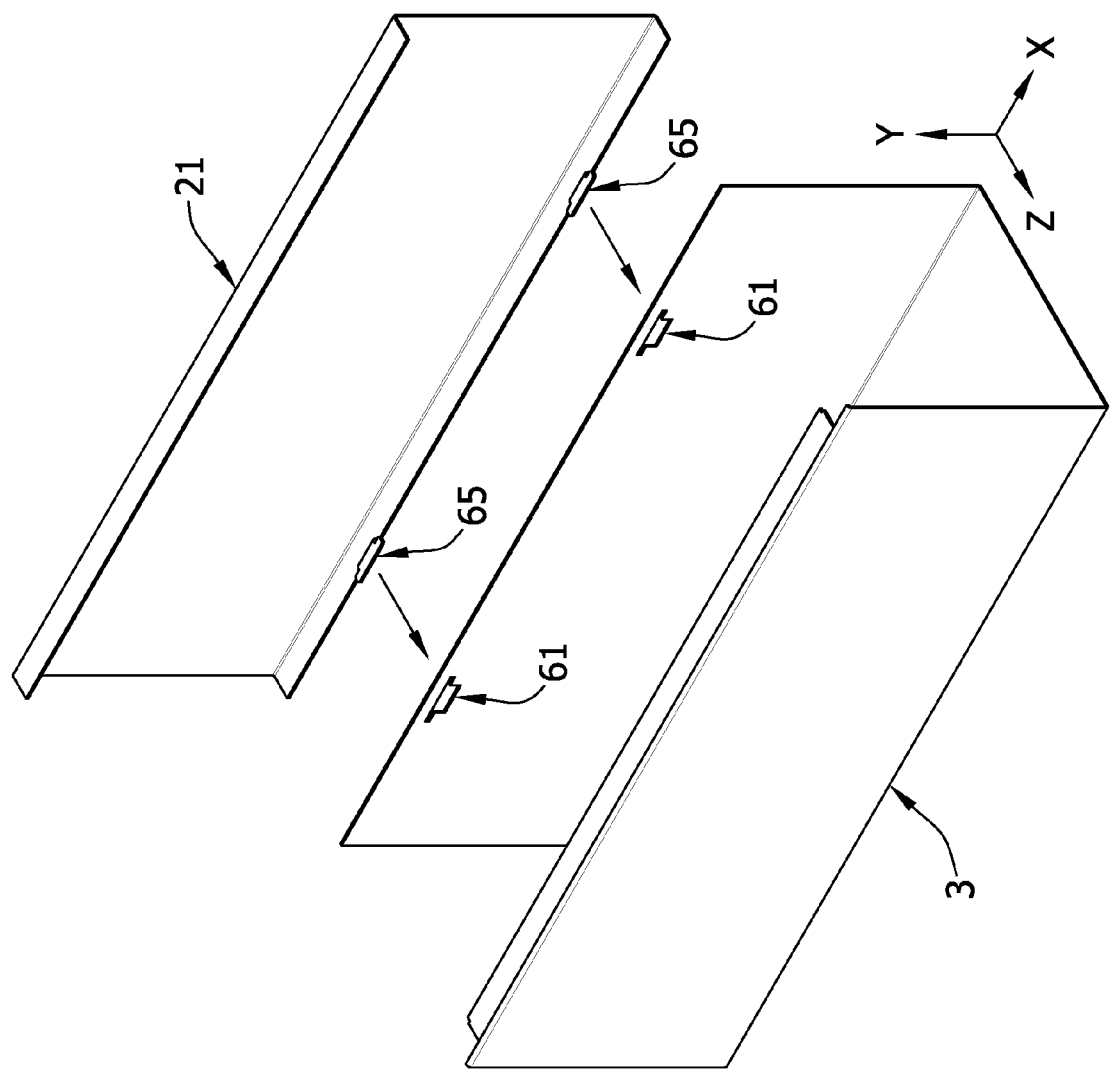
FIG. 11 is a view showing a first step in the process of installing the cover on the body.
Figure 12:
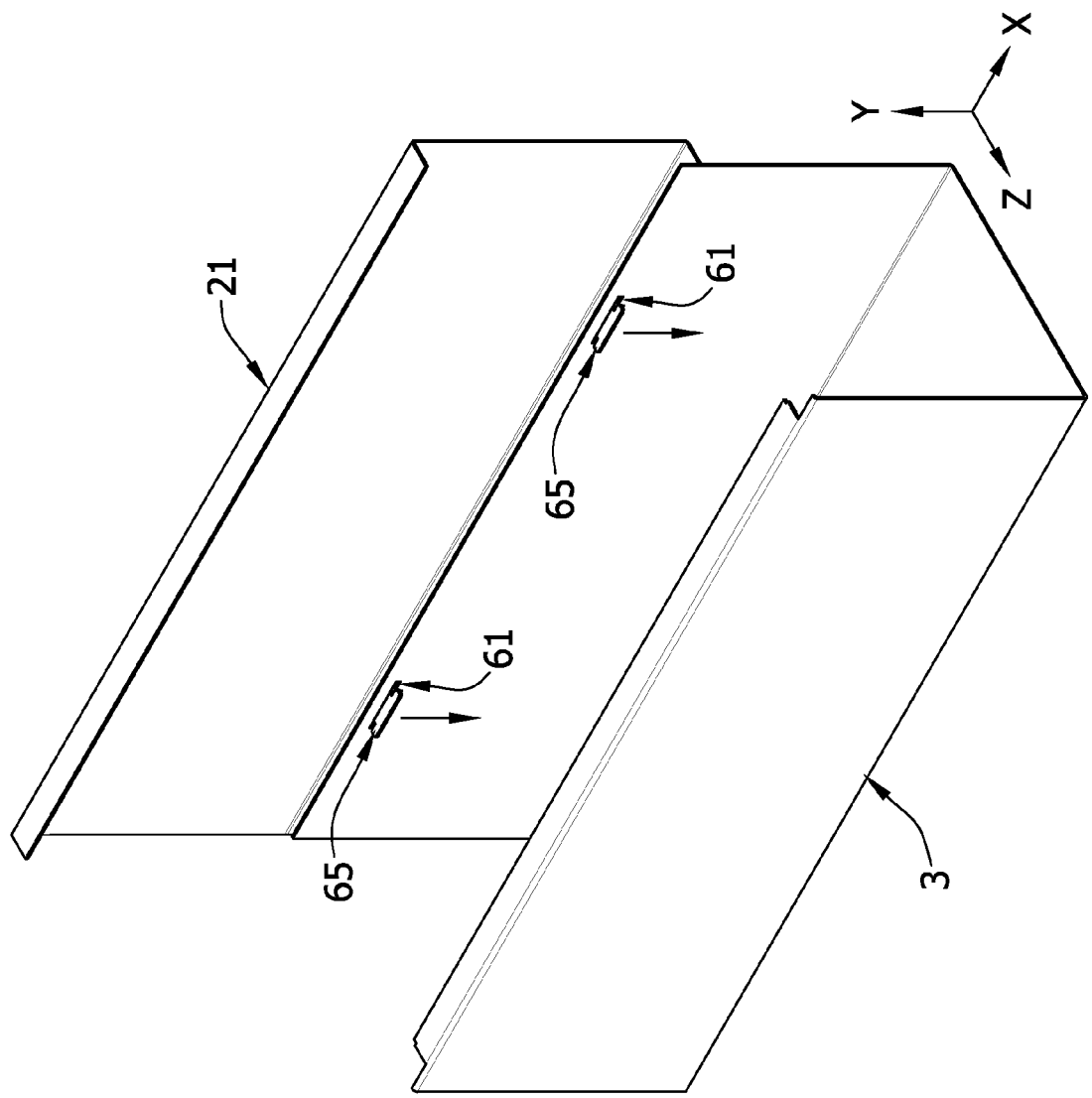
FIG. 12 is a view similar to FIG. 11 but showing a second step in the process.
Figure 13:
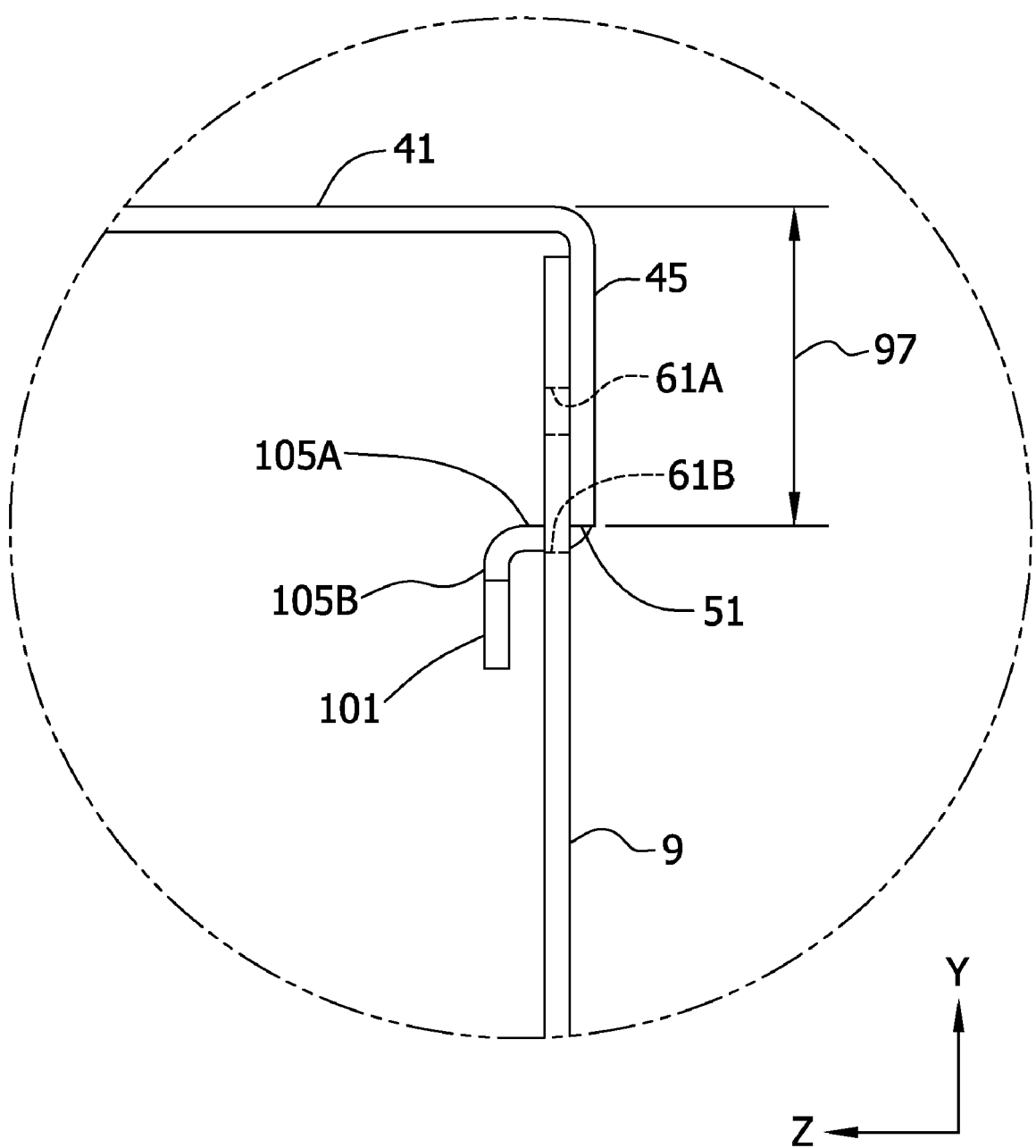
FIG. 13 is a view similar to FIG. 5 showing the hinge construction with the cover in a closed position.

In use, the cover 21 is installed on the body 3 by following the steps shown in FIGS. 11 and 12. The cover is initially held in the position shown in FIG. 11 in which the heads 101 of the hinge members 65 are aligned with the upper portions 61A of the corresponding slots 61 in the first side wall 9. After passing the heads through the upper slot portions 61A, the cover is lowered (FIG. 12) to move the outer stem portions 105B of the hinge members down to positions in which they are received in the lower narrower slot portions 61B of respective slots (FIG. 3). The cover is then rotated about the axis 27 of the hinge connection 25 established by the hinge members and slots to its closed position (FIGS. 1 and 13). As the cover is rotated to this position, the hinge members 65 move in the slots 61 from the position shown in FIG. 5 in which the cover is open, to the position shown in FIG. 13 in which the cover is closed. In the FIG. 13 position, the inner stem portion 105A of each hinge member rests in the lower slot portion 61B of a respective slot 61 with the head 101 positioned generally parallel to the side wall 65 of the body and below the lower slot portion 61B to prevent inadvertent disengagement of the hinge connection. During ordinary use, the cover can be swung between its open and closed positions without risk of inadvertent separation of the cover from the body. However, if the cover is to be removed, the steps of the installation procedure described above are simply reversed. The removal process is also quickly and easily carried out without the use of tools.

Exemplary dimensions are given below. These dimensions are exemplary only and should not be considered to be limiting.

Slot 61 Dimensions (Exemplary Only)
X-dimension 85—about 1.21 in.
X-dimension 91—about 0.75 in.
Y-dimension 75—about 0.331 in.
Y-dimension 83—about 0.25 in.
Y-dimension 87—about 0.10 in.
Y-dimension 99—about 0.681 in.
Hinge Member 65 Dimensions (Exemplary Only)
X-dimension 109—about 0.725 in.
X-dimension 121—about 1.125 in.
Y-dimension 115—about 0.075 in.
Y-dimension 125—about 0.175 in.
Z-dimension 111—about 0.128 in.
Z-dimension 129—about 0.053-0.060 in. (material thickness)

In view of the foregoing, it will be observed that the cover can be installed without the use of tools, or with only minimal use of tools. The cover can be opened and closed and removed with only minimal effort. As a result, installation and maintenance time is reduced. Further, the process can be accomplished with one hand, leaving the other hand free to maintain balance, which is especially desirable when working at higher elevations above the floor.

In another embodiment, not shown, slots 61 are provided not only in the first side wall 9 of the body 3 of the wireway section but also in the second side wall 13 of the body to hinge the cover 21 on the body for swinging between open and closed positions about a second axis extending lengthwise of the body. This construction allows the cover 21 to be selectively hinged at either side of the body for added convenience and flexibility. By way of example, it may be preferred in some situations to mount the cover so it hinges to the side wall 9 to open in one direction and in other situations it may be preferred to mount the cover so it hinges to the side wall 13 to open in the opposite direction. By providing slots 61 in both side walls, the hinge connection 25 can be established at either side of the wireway body as needed or desired.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements. Further, the terms "upper", "lower", "down" and "up" are used for convenience only, and it will be understood that other orientations (e.g., non-vertical or reverse) are possible.

In view of the above, it will be seen that the several objects of the invention are achieved and other advantageous results attained.

As various changes could be made in the above constructions/products without departing from the scope of the invention, it is intended that all matter contained in the above description and shown in the accompanying drawing shall be interpreted as illustrative and not in a limiting sense.

What is claimed is:

1. A section of wireway comprising
   an elongate channel-shaped body having a first side wall, a second side wall and a bottom wall, said body having a length along an X-axis, a height along a Y-axis and a width along a Z-axis,
   an elongate cover for the body having a releasable hinge connection with the first side wall of the body for swinging between open and closed positions about an axis extending lengthwise of the body, said cover having a length along said X-axis and a width along said Z-axis when the cover is closed,
   said hinge connection comprising at least two slots in the first side wall of the body at locations spaced along the length of the body, and at least two hinge members on the cover receivable in said slots for hinging the cover to the body,
   each of said slots comprising an upper portion and a lower portion narrower than said upper portion along said X-axis, and
   each of said hinge members comprising a head sized for insertion through the upper portion of a respective slot and a stem narrower than the head along said X-axis sized for reception in the lower portion of the slot, said head having an X-dimension greater than an X-dimension of the lower portion of the slot,
   wherein the cover comprises a top wall adapted to span the side walls of the body when the cover is closed, and a first flange means on the top wall adapted to extend down alongside the first side wall of the body when the cover is closed, said hinge members being on said first flange means,
   wherein the stem of each hinge member comprises an inner stem portion projecting from said first flange means generally along said Z-axis and an outer stem portion extending from the inner stem portion generally along said Y-axis away from the top wall of the cover, and
   wherein the head of each hinge member is attached to the outer stem portion.

2. A section of wireway as set forth in claim 1 wherein the head of each hinge member is planar and lies in a plane which extends generally parallel to said first side wall when the cover is closed.

3. A section of wireway as set forth in claim 1 wherein the head of each hinge member is dimensioned for passage through the upper portion of a respective slot and the stem of each hinge member is dimensioned for reception in the lower portion of a respective slot.

4. A section of wireway as set forth in claim 3 wherein the head of the hinge member has an X-dimension greater than a corresponding X-dimension of the lower portion of the slot whereby the hinge member cannot be removed from the slot when the stem of the hinge member is received in the lower portion of the slot.

5. A section of wireway as set forth in claim 4 wherein the head of the hinge member has a Z-dimension only slightly less than a Y-dimension of the upper portion of the slot.

6. A section of wireway as set forth in claim 4 wherein the stem of the hinge member has a X-dimension only slightly less than a X-dimension of the lower portion of the slot.

7. A section of wireway as set forth in claim 1 wherein said first flange means is configured to cover said slots when the cover is closed.

8. A section of wireway as set forth in claim 1 wherein each of said slots is generally T-shaped.

9. A section of wireway as set forth in claim 8 wherein each of said hinge members is generally T-shaped.

10. A section of wireway as set forth in claim 1 wherein said outer stem portion and head are generally co-planar.

11. A section of wireway as set forth in claim 1 further comprising at least two slots in the second side wall of the body at locations spaced along the length of the body for receiving respective hinge members to hinge the cover on the body for swinging between open and closed positions about a second axis extending lengthwise of the body.

12. A wireway cover comprising an elongate cover member for a wireway body, said cover having a length and a width, and at least two hinge members on the cover receivable in slots in the wireway body for hinging the cover to the body, each of said hinge members comprising a head sized for insertion through an upper portion of a respective slot in the wireway body and a stem narrower than the head sized for reception in a lower portion of the slot, wherein the cover comprises a top wall adapted to span opposing side walls of the body when the cover is closed, and a first flange means on the top wall adapted to extend down alongside one of the side walls of the body when the cover is closed, said hinge members being on said first flange means, wherein the stem of each hinge member comprises an inner stem portion projecting from said first flange means generally parallel to the top wall of the cover and an outer stem portion extending generally at right angles from the inner stem portion away from the top wall of the cover, and wherein the head of each hinge member is attached to the outer stem portion.

13. A wireway cover as set forth in claim 12 wherein each of said two hinge members is T-shaped.

14. A wireway cover as set forth in claim 12 wherein the head of each hinge member is planar and lies in a plane which extends generally perpendicular to the top wall of the cover.

15. A section of wireway as set forth in claim 12 wherein said outer stem portion and head are generally co-planar.

16. A section of wireway comprising an elongate channel-shaped body having a first side wall, a second side wall and a bottom wall, said body having a length along an X-axis, a height along a Y-axis and a width along a Z-axis, an elongate cover for the body having a releasable hinge connection with the first side wall of the body for swinging between open and closed positions about an axis extending lengthwise of the body, said cover having a length along said X-axis and a width along said Z-axis when the cover is closed, said hinge connection comprising at least two slots in the first side wall of the body at locations spaced along the length of the body, and at least two hinge members on the cover receivable in said slots for hinging the cover to the body, each of said slots comprising an upper portion and a lower portion narrower than said upper portion along said X-axis, and each of said hinge members comprising a head sized for insertion through the upper portion of a respective slot and a stem narrower than the head along said X-axis sized for reception in the lower portion of the slot, said head having an X-dimension greater than an X-dimension of the lower portion of the slot, said cover comprising a top wall adapted to span the side walls of the body when the cover is closed, and a first flange means on the top wall adapted to extend down alongside the first side wall of the body when the cover is closed, said hinge members being on said first flange means, and wherein said first flange means is configured to cover said slots when the cover is closed.

\* \* \* \* \*